(12) United States Patent
Cayol et al.

(10) Patent No.: US 12,275,405 B2
(45) Date of Patent: Apr. 15, 2025

(54) METHOD FOR CONTROLLING AN INTER-VEHICLE DISTANCE REGULATION SYSTEM

(71) Applicants: RENAULT s.a.s., Boulogne-Billancourt (FR); NISSAN MOTOR CO., LTD., Yokohama (JP)

(72) Inventors: Olivier Cayol, Versailles (FR); Eric Debernard, Voisins-le-Bretonneux (FR); Klaus Krumbiegel, Chemnitz (DE); Marc Lavabre, Vaucresson (FR); Michael Sachse, Chemnitz (DE)

(73) Assignees: AMPERE S.A.S., Boulogne-Billancourt (FR); NISSAN MOTOR CO., LTD., Yokohama (JP)

( * ) Notice: Subject to any disclaimer, the term of this patent is extended or adjusted under 35 U.S.C. 154(b) by 268 days.

(21) Appl. No.: 17/637,229

(22) PCT Filed: Aug. 20, 2020

(86) PCT No.: PCT/EP2020/073397
§ 371 (c)(1),
(2) Date: Feb. 22, 2022

(87) PCT Pub. No.: WO2021/043589
PCT Pub. Date: Mar. 11, 2021

(65) Prior Publication Data
US 2022/0274597 A1 Sep. 1, 2022

(30) Foreign Application Priority Data
Sep. 5, 2019 (FR) ...................................... 1909762

(51) Int. Cl.
*B60W 30/17* (2020.01)

(52) U.S. Cl.
CPC ......... *B60W 30/17* (2013.01); *B60W 2520/10* (2013.01); *B60W 2554/4042* (2020.02); *B60W 2554/802* (2020.02); *B60W 2754/30* (2020.02)

(58) Field of Classification Search
CPC ......... B60W 30/17; B60W 2554/4042; B60W 2754/30; B60W 2520/10
(Continued)

(56) References Cited

U.S. PATENT DOCUMENTS 3,941,201 A * 3/1976 Hermann ............... G08G 1/075
246/167 R
6,056,374 A * 5/2000 Hiwatashi .......... B60K 31/0008
303/193
(Continued)

FOREIGN PATENT DOCUMENTS

WO    WO 2018/115963 A2    6/2018

OTHER PUBLICATIONS

International Search Report issued on Dec. 2, 2020 in PCT/EP2020/073397 filed Aug. 20, 2020, 2 pages.
(Continued)

*Primary Examiner* — Richard A Goldman
(74) *Attorney, Agent, or Firm* — Oblon, McClelland, Maier & Neustadt, L.L.P.

(57) ABSTRACT

A method is for controlling a system for regulating a distance between a target vehicle and a following vehicle, with the regulation system being installed on the following vehicle. The method includes the implementation of a control law for regulating the distance which calculates, for a plurality of possible combinations of speeds of movement of the following vehicle and the target vehicle, potential setpoint distances, and, for a given combination of speeds of movement of the following and target vehicles, from the plurality of possible combinations, the determination of a
(Continued)

Figure 1:
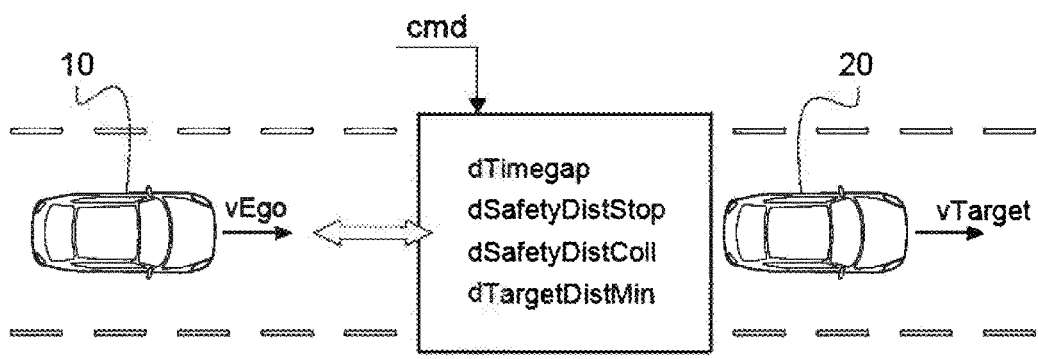

final setpoint distance among the potential setpoint distances previously calculated by the control law.

9 Claims, 2 Drawing Sheets

(58) Field of Classification Search
USPC .......................................................... 701/96
See application file for complete search history.

(56) References Cited

U.S. PATENT DOCUMENTS

| | | | | |
|---|---|---|---|---|
| 6,150,932 | A * | 11/2000 | Kenue | B60Q 9/008 340/904 |
| 8,219,298 | B2 * | 7/2012 | Nishira | B60W 50/0097 701/1 |
| 9,988,050 | B2 * | 6/2018 | Yamashita | B60W 10/18 |
| 11,186,279 | B2 * | 11/2021 | Fukuda | B60W 30/12 |
| 11,789,113 | B2 * | 10/2023 | Sick | G06T 7/11 342/107 |
| 2002/0135507 | A1 * | 9/2002 | Winner | B60K 31/0008 342/72 |
| 2004/0111301 | A1 * | 6/2004 | Wahlbin | G06Q 40/08 705/4 |
| 2006/0077050 | A1 * | 4/2006 | Takahashi | B60Q 9/008 342/72 |
| 2009/0321165 | A1 * | 12/2009 | Haug | B60W 20/00 180/65.21 |
| 2010/0042305 | A1 * | 2/2010 | Attallah | B60T 7/22 701/93 |
| 2012/0101713 | A1 * | 4/2012 | Moshchuk | B60W 40/064 701/301 |
| 2013/0211686 | A1 * | 8/2013 | Shono | G06F 17/00 701/70 |
| 2014/0088849 | A1 * | 3/2014 | Ham | G06F 17/00 701/70 |
| 2014/0207352 | A1 * | 7/2014 | Rossi | B60T 7/22 701/70 |
| 2014/0232561 | A1 * | 8/2014 | Musachio | G08G 1/08 340/932 |
| 2015/0153735 | A1 * | 6/2015 | Clarke | G06T 7/70 701/301 |
| 2017/0259822 | A1 * | 9/2017 | Schubert | B60W 10/18 |
| 2018/0154895 | A1 * | 6/2018 | Chae | B60W 10/20 |
| 2018/0178794 | A1 * | 6/2018 | Schwindt | B60W 30/162 |
| 2019/0071084 | A1 * | 3/2019 | Tuncali | B60W 30/165 |
| 2019/0092168 | A1 * | 3/2019 | Burtch | B60K 31/0008 |
| 2019/0100198 | A1 * | 4/2019 | Hakki | B60Q 1/535 |
| 2019/0291727 | A1 | 9/2019 | Shalev-Shwartz et al. | |
| 2019/0295179 | A1 * | 9/2019 | Shalev-Shwartz | B62D 15/0265 |
| 2019/0299983 | A1 | 10/2019 | Shalev-Shwartz et al. | |
| 2019/0308617 | A1 * | 10/2019 | Groult | B60Q 1/543 |
| 2020/0216062 | A1 * | 7/2020 | Hakki | B60W 30/09 |
| 2020/0324766 | A1 * | 10/2020 | Zhao | B60W 30/16 |
| 2020/0391593 | A1 * | 12/2020 | Lee | G08G 1/095 |
| 2021/0053561 | A1 * | 2/2021 | Beller | B60W 30/18154 |
| 2022/0274597 | A1 * | 9/2022 | Cayol | B60W 30/16 |
| 2022/0410923 | A1 * | 12/2022 | Matthaei | B60W 30/165 |
| 2023/0087852 | A1 * | 3/2023 | Sugano | G08G 1/148 701/96 |
| 2023/0322220 | A1 * | 10/2023 | Sujan | B60W 10/10 701/36 |
| 2023/0406355 | A1 * | 12/2023 | Baba | B60W 40/105 |
| 2024/0001963 | A1 * | 1/2024 | Kinakar | B60W 60/0015 |

OTHER PUBLICATIONS

French Preliminary Search Report (with English translation of Categories of Cited Documents) issued on May 20, 2020 in French Application 1909762 filed on Sep. 5, 2019, 3 pages.

* cited by examiner

METHOD FOR CONTROLLING AN INTER-VEHICLE DISTANCE REGULATION SYSTEM

The invention relates to the field of driving assistance for a motor vehicle. More particularly, the invention relates to a method for controlling a system for regulating an inter-vehicle distance.

The driving assistance functions available in current vehicles are targeted at improving ride comfort and at reducing road hazards. To this end, efforts have been made to develop functions which allow a predetermined setpoint distance or safe distance between two vehicles to be maintained. Thus, an ACC ("Adaptive Cruise Control") system is available in certain vehicles. This system with which a vehicle, referred to as the follower vehicle, is equipped makes it possible to detect the vehicle which precedes it, referred to as the target vehicle, the follower vehicle being equipped with a laser or with a camera, to estimate the speed and the distance of the target vehicle, then to control the speed of the follower vehicle in order to maintain a safe distance. In many countries road regulations stipulate that the follower vehicle must keep a safe distance, in particular with the aim of avoiding a collision when the preceding vehicle brakes or stops. The safe distance depends mainly on the speed of the follower vehicle. For example, according to French road regulations, this safe distance corresponds to a distance covered by the follower vehicle in a defined time interval, which is of at least two seconds. In other words, the regulations require a distance equivalent to two seconds of travel to be left between the follower vehicle and the target vehicle, since this time interval in theory allows the users to stay safe in the event of sudden braking.

From the patent document U.S. Pat. No. 6,789,637, for example, a distance-controlling mechanism for a motor vehicle is known, the device being suitable for observing a setpoint distance or a setpoint time interval with respect to a target vehicle, depending on the travel speed, the distance control taking into account a minimum distance or a minimum time interval, which may be specified by the driver, when determining the setpoint distance or the setpoint time interval. In response to poor visibility conditions detected by sensors with which the vehicle is equipped, provision is made for the distance-controlling device to increase the setpoint time interval determined for normal visibility. The control device therefore implements a time interval which may be adapted depending on the visibility conditions in order to compute the setpoint distance.

However, situations exist in which controlling the safe distance behind the target vehicle according to the principles summarized above with reference to the document of the prior art is not sufficient to allow collisions to be avoided, notably in the event that the braking capacity of the follower vehicle is impaired, for example because of substantial slipping of the wheels of the vehicle.

Thus, in these specific situations and at higher speeds, regulating the distance based on the time interval with a view to implementing ACC functions does not offer sufficient guarantees as far as the capacity to avoid possible collisions is concerned, even though the ultimate aim of these assistance functions is to reduce road hazards as far as possible.

Thus, one aim of the invention is to provide a method for controlling regulation of the safe distance from a target vehicle, overcoming at least in part the drawbacks of the prior art. In particular, one aim is to reduce the scenarios in which a collision with the preceding vehicle cannot be avoided.

To this end, the invention relates to a method for controlling a system for regulating a distance between a target vehicle and a follower vehicle, the regulating system being on board the follower vehicle, the method comprising:
implementing a control law for regulating the distance which computes, for a plurality of possible combinations of travel speeds of the follower vehicle and of the target vehicle, at least the following potential setpoint distances:

a first distance dTimegap computed on the basis of a predetermined time interval tTimegapDist, corresponding to the distance covered by said follower vehicle in said time interval depending on its travel speed vEgo, a second distance dSafetyDistStop computed depending on the respective travel speeds vEgo and vTarget of the follower and target vehicles and on predetermined deceleration values aEgoSafetyDist and aTargetSafetyDist for said vehicles, said predetermined deceleration values corresponding to the deceleration which said vehicles undergo during emergency braking, a third distance dSafetyDistColl established on the basis of a predetermined speed of collision with a preceding stationary vehicle, defined with respect to a specified maximum speed vAccidentVelocity for such a collision, said third distance being computed depending on the travel speed vEgo of the follower vehicle, on the specified maximum speed vAccidentVelocity and on the predetermined deceleration value aEgoSafetyDist for the follower vehicle, a fourth distance corresponding to a minimum stationary distance of the follower vehicle with respect to the target vehicle, and, for a given combination of travel speeds of the follower and target vehicles from among the plurality of possible combinations, determining a final setpoint distance from among said potential setpoint distances previously computed by means of said control law.

According to a preferred embodiment, determining the final setpoint distance comprises evaluating the distance corresponding to the maximum of the first, second, third and fourth potential distances for the given combination of travel speeds of the follower and target vehicles.

According to one feature, said second potential distance is computed using the respective travel speed values vEgo and vTarget for the follower and target vehicles and the predetermined deceleration values aEgoSafetyDist and aTargetSafetyDist for said vehicles, using the following expression:

$$dSafetyDistStop = \max\left(vEgo \cdot tSystemTolerance - \frac{0.5 \cdot vEgo^2}{aEgoSafetyDist} + \frac{0.5 \cdot vTarget^2}{aTargetSafetyDist}, 0\right)$$

the parameter tSystemTolerance corresponding to a delay time of the system.

According to another feature, said third potential distance is computed using the travel speed value vEgo for the follower vehicle, the specified maximum speed value vAccidentVelocity for a collision and the predetermined deceleration value aEgoSafetyDist for the follower vehicle, using the following expression:

$$dSafetyDistColl = \max\left(vEgo \cdot tSystemTolerance + 0.5 \cdot \frac{vAccidentVelocity^2 - vEgo^2}{aEgoSafetyDist}, 0\right)$$

the parameter tSystemTolerance corresponding to a delay time of the system.

Preferably, the delay time of the system is defined by the time needed to reach the required braking force and/or by the perception-reaction time of the system.

Figure 2:
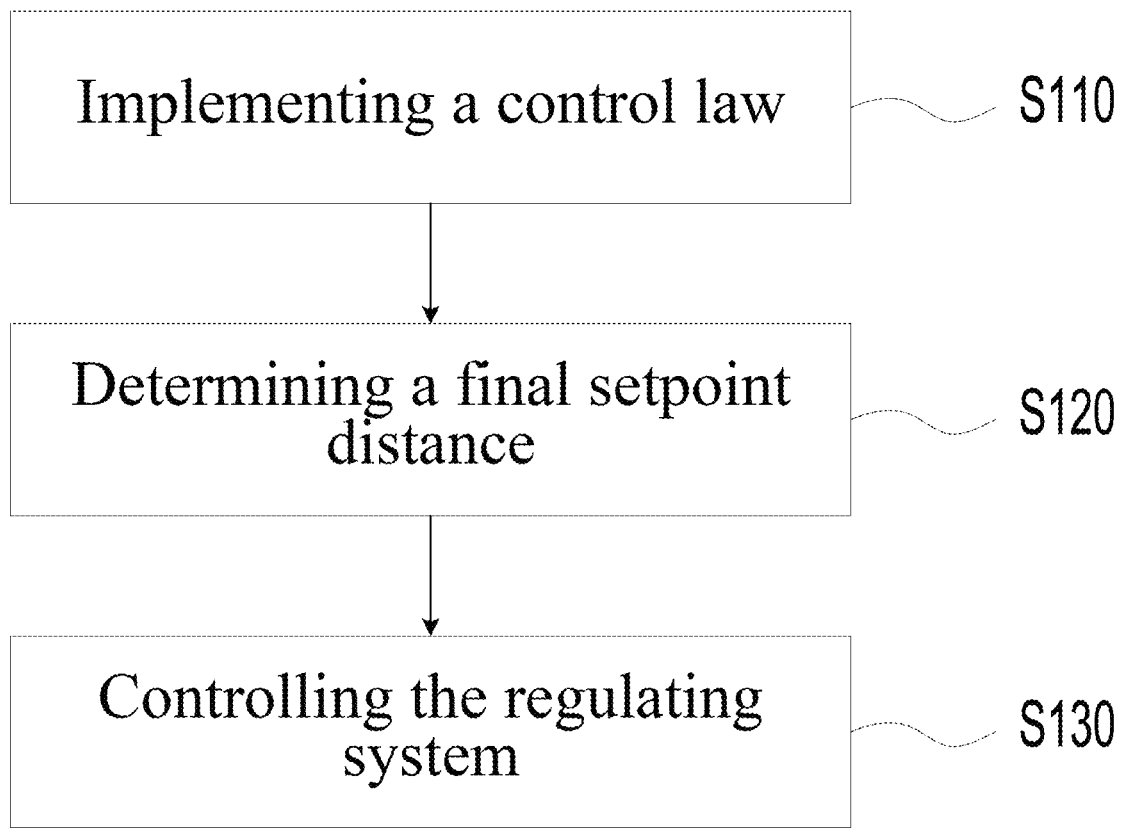

Other features and advantages of the present invention will become more clearly apparent on reading the following description, which is given, by way of illustrative and non-limiting example, with reference to the following figures:

FIG. 1 schematically illustrates the distance-regulating system according to the invention; and FIG. 2 illustrates a method performed by the distance-regulating system.

With reference to FIG. 1, the distance-regulating system according to the invention is targeted at regulating in such a way that a follower vehicle 10 equipped with the system may follow a vehicle in front, referred to as the target vehicle 20, at a given distance, referred to as the safe distance. Typically, the follower vehicle 10 is equipped with measuring means, for example of radar type, which allow the distance and the relative speed between the follower vehicle and a target vehicle to be measured, and with an on-board speed sensor which is able to provide information on the speed of the vehicle.

As shown in FIG. 2, in the method 100, a control law of the system is then designed S110 to provide acceleration and deceleration setpoints to be applied to the vehicle on the basis of the measured relative distance, of the speed of the follower vehicle and of its relative speed with respect to the target vehicle, depending on a setpoint safe distance, in order to control the longitudinal position of the follower vehicle with respect to the target vehicle, so as to keep the distance between the follower and target vehicles substantially constant around the setpoint value.

This regulation S130 is performed by acting on the engine torque and the brakes, depending on whether a motive force or a braking force must be applied to the system in order to comply with the setpoint distance.

The control law cmd of the regulating system is based, according to the invention, on determining a setpoint distance, chosen from among various definitions of the notion of safe distance, which will be clarified below, depending on a given combination of the travel speed vEgo of the follower vehicle on one hand and the travel speed vTarget of the target vehicle on the other hand.

A first definition of the safe distance used by the control law is based on the notion of distance covered by the follower vehicle in a given time interval, referenced tTimegapDist.

This safe distance based on complying with a given time interval from the preceding vehicle results more specifically from regulatory requirements. Thus, road regulations notably in France and in Germany stipulate that the follower vehicle must keep a safe distance with the aim of avoiding a collision when the preceding vehicle brakes or stops. The safe distance thus corresponds to the distance covered by the follower vehicle in a given time interval tTimegapDist, which is set for example to 2 seconds in France and 1.8 seconds in Germany. The regulations therefore require a minimum distance to be kept based on this given time interval. In other words, this safe distance, referenced dTimegap, is computed on the basis of the given time interval tTimegapDist multiplied by the speed of the follower vehicle with respect to the preceding vehicle:

$$dTimegap = vEgo \cdot tTimegapDist$$

The parameter tTimegapDist therefore allows this safe distance to be adjusted.

The following table provides the safe distance based on a time interval set to 2 seconds for various speeds of the follower vehicle and of the target vehicle in km/h.

TABLE 1

| | dTimegap (m) | | | | | | | | | | | | | |
|---|---|---|---|---|---|---|---|---|---|---|---|---|---|---|
| | vTarget | | | | | | | | | | | | | |
| vEgo | 0.0 | 10.0 | 20.0 | 30.0 | 40.0 | 50.0 | 60.0 | 70.0 | 80.0 | 90.0 | 100.0 | 110.0 | 120.0 | 130.0 |
| 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| 10.0 | 5.56 | 5.56 | 5.56 | 5.56 | 5.56 | 5.56 | 5.56 | 5.56 | 5.56 | 5.56 | 5.56 | 5.56 | 5.56 | 5.56 |
| 20.0 | 11.11 | 11.11 | 11.11 | 11.11 | 11.11 | 11.11 | 11.11 | 11.11 | 11.11 | 11.11 | 11.11 | 11.11 | 11.11 | 11.11 |
| 30.0 | 16.67 | 16.67 | 16.67 | 16.67 | 16.67 | 16.67 | 16.67 | 16.67 | 16.67 | 16.67 | 16.67 | 16.67 | 16.67 | 16.67 |
| 40.0 | 22.22 | 22.22 | 22.22 | 22.22 | 22.22 | 22.22 | 22.22 | 22.22 | 22.22 | 22.22 | 22.22 | 22.22 | 22.22 | 22.22 |
| 50.0 | 27.78 | 27.78 | 27.78 | 27.78 | 27.78 | 27.78 | 27.78 | 27.78 | 27.78 | 27.78 | 27.78 | 27.78 | 27.78 | 27.78 |
| 60.0 | 33.333 | 33.33 | 33.33 | 33.33 | 33.33 | 33.33 | 33.33 | 33.33 | 33.33 | 33.33 | 33.33 | 33.33 | 33.33 | 33.33 |
| 70.0 | 38.89 | 38.89 | 38.89 | 38.89 | 38.89 | 38.89 | 38.89 | 38.89 | 38.89 | 38.89 | 38.89 | 38.89 | 38.89 | 38.89 |
| 80.0 | 44.44 | 44.44 | 44.44 | 44.44 | 44.44 | 44.44 | 44.44 | 44.44 | 44.44 | 44.44 | 44.44 | 44.44 | 44.44 | 44.44 |
| 90.0 | 50.00 | 50.00 | 50.00 | 50.00 | 50.00 | 50.00 | 50.00 | 50.00 | 50.00 | 50.00 | 50.00 | 50.00 | 50.00 | 50.00 |
| 100.0 | 55.56 | 55.56 | 55.56 | 55.56 | 55.56 | 55.56 | 55.56 | 55.56 | 55.56 | 55.56 | 55.56 | 55.56 | 55.56 | 55.56 |
| 110.0 | 61.11 | 61.11 | 61.11 | 61.11 | 61.11 | 61.11 | 61.11 | 61.11 | 61.11 | 61.11 | 61.11 | 61.11 | 61.11 | 61.11 |
| 120.0 | 66.67 | 66.67 | 66.67 | 66.67 | 66.67 | 66.67 | 66.67 | 66.67 | 66.67 | 66.67 | 66.67 | 66.67 | 66.67 | 66.67 |
| 130.0 | 72.22 | 72.22 | 72.22 | 72.22 | 72.22 | 72.22 | 72.22 | 72.22 | 72.22 | 72.22 | 72.22 | 72.22 | 72.22 | 72.22 |

A second definition of the safe distance used by the control law cmd of the invention is based on the notion of stopping distance of the vehicle. This is the distance which is needed by the vehicle to stop. This distance with respect to the preceding vehicle must be chosen so that the follower vehicle may stop behind the preceding vehicle, even in the event of sudden braking by the preceding vehicle. It is linked to the presumed performance of the follower vehicle and of the target vehicle in terms of braking capacity, but also takes into account a delay time of the system.

Thus, in order to determine this stopping distance, a presumed braking capacity of the follower vehicle, referenced aEgoSafetyDist, and a presumed braking capacity of the target vehicle, referenced aTargetSafetyDist, have to be taken into account. Furthermore, the delay time of the system, referenced tSystemTolerance, has to be taken into account, which for example depends on the time needed to achieve the required braking force and/or on the perception-reaction time of the system with respect to the emergency braking situation.

As indicated above, this definition of the safe distance based on the stopping distance is targeted at making it possible to manage the cases of sudden braking by the preceding vehicles, avoiding collisions. In other words, if the distance kept by the follower vehicle with respect to the target vehicle corresponds to this stopping distance, it should be possible, with the guaranteed level of deceleration, for the follower vehicle to stop behind the target vehicle in a sudden braking phase.

This safe distance, referenced dSafetyDistStop, is computed in the following way depending on the respective travel speeds vEgo and vTarget of the follower and target vehicles and on predetermined deceleration values aEgoSafetyDist and aTargetSafetyDist for said vehicles, said predetermined deceleration values therefore corresponding to the deceleration which said vehicles undergo during emergency braking:

$$dSafetyDistStop = \max\left(vEgo \cdot tSystemTolerance - \frac{0.5 \cdot vEgo^2}{aEgoSafetyDist} + \frac{0.5 \cdot vTarget^2}{aTargetSafetyDist}, 0\right)$$

In order to provide a certain safety margin when determining this stopping distance, it will be assumed that the follower vehicle has a lesser braking capacity than that of the target vehicle, for example about 2 m/s$^2$. In other words:

aEgoSafetyDist−aTargetSafetyDist=2 m/s$^2$.

The following table provides values of the safe distance based on the stopping distance dSafetyDistStop, computed for various combinations of speeds of the follower vehicle and of the target vehicle in km/h, with input parameters of aEgoSafetyDist=−3.7 m/s$^2$ and aTargetSafetyDist=−5.7 m/s$^2$.

Furthermore, the delay time tSystemTolerance of the system is set to 0.4 seconds.

Thus, by way of example, in the event that the speed of the follower vehicle and the speed of the target vehicle are both equal to 50 km/h, while maintaining a safe distance of about 14.7 m with respect to the target vehicle, the deceleration level of −3.7 m/s$^2$ is sufficient to stop the follower vehicle behind the target vehicle, assuming that the latter brakes with a deceleration level of −5.7 m/s$^2$.

If the target speed is considered to be equal to zero, the first column of the above table also makes it possible to take into account situations with a stationary object in front of the vehicle, whether a vehicle or a pedestrian, by providing the distance needed to stop behind this stationary object with a deceleration level equal to −3.7 m/s$^2$, for various speeds of the follower vehicle.

A third definition of the safe distance used by the control law cmd of the invention is based on the fact of ensuring a certain collision speed less than a specified speed, while the preceding vehicle is stationary.

The collision speed is the impact speed of the vehicle at the moment when it hits the obstacle. This safe distance based on complying with a certain collision speed will possibly make it possible to manage mainly two different cases of use. A first case of use relates to a situation in which the preceding, target vehicle detects an obstacle in front of it and avoids it without reducing its speed. Thus, in such a situation, the follower vehicle will be able to detect the obstacle only after the maneuver to avoid said obstacle by the preceding vehicle or, at best, during this avoiding maneuver. A second case of use relates to a situation in which the target vehicle preceding the follower vehicle is involved in a pile-up, such that it is immobilized much faster than in the event of emergency braking. The safe distance required of the follower vehicle must nevertheless make it possible for it to manage these situations.

The definition of this safe distance based on a predefined collision speed includes taking into account the two parameters already defined in connection with the second definition, summarized above, of the safe distance based on the stopping distance, namely the delay time tSystemTolerance of the system of the follower vehicle and its presumed maximum braking capacity EgoSafetyDist. The safe distance is defined so that the speed of collision of the follower vehicle with the preceding vehicle (or object) is less than a specified maximum speed for a collision, referenced vAccidentVelocity.

TABLE 2 dSafetyDistStop (m)

| | vTarget | | | | | | | | | | | | | |
|---|---|---|---|---|---|---|---|---|---|---|---|---|---|---|
| vEgo | 0.0 | 10.0 | 20.0 | 30.0 | 40.0 | 50.0 | 60.0 | 70.0 | 80.0 | 90.0 | 100.0 | 110.0 | 120.0 | 130.0 |
| 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| 10.0 | 2.2 | 1.5 | 0.0 | 0.0 | 0.0 | 0.0 | 0.0 | 0.0 | 0.0 | 0.0 | 0.0 | 0.0 | 0.0 | 0.0 |
| 20.0 | 6.4 | 5.7 | 3.7 | 0.3 | 0.0 | 0.0 | 0.0 | 0.0 | 0.0 | 0.0 | 0.0 | 0.0 | 0.0 | 0.0 |
| 30.0 | 12.7 | 12.0 | 10.0 | 6.6 | 1.9 | 0.0 | 0.0 | 0.0 | 0.0 | 0.0 | 0.0 | 0.0 | 0.0 | 0.0 |
| 40.0 | 21.1 | 20.5 | 18.4 | 15.0 | 10.3 | 4.2 | 0.0 | 0.0 | 0.0 | 0.0 | 0.0 | 0.0 | 0.0 | 0.0 |
| 50.0 | 31.6 | 30.9 | 28.9 | 25.5 | 20.8 | 14.7 | 7.3 | 0.0 | 0.0 | 0.0 | 0.0 | 0.0 | 0.0 | 0.0 |
| 60.0 | 44.2 | 43.5 | 41.5 | 38.1 | 33.4 | 27.3 | 19.8 | 11.0 | 0.9 | 0.0 | 0.0 | 0.0 | 0.0 | 0.0 |
| 70.0 | 58.9 | 58.2 | 56.2 | 52.8 | 48.0 | 41.9 | 34.5 | 25.7 | 15.6 | 4.0 | 0.0 | 0.0 | 0.0 | 0.0 |
| 80.0 | 75.6 | 74.9 | 72.9 | 69.5 | 64.8 | 58.7 | 51.3 | 42.5 | 32.3 | 20.8 | 7.9 | 0.0 | 0.0 | 0.0 |
| 90.0 | 94.5 | 93.8 | 91.8 | 88.4 | 83.6 | 77.5 | 70.1 | 61.3 | 51.1 | 39.6 | 26.8 | 12.6 | 0.0 | 0.0 |
| 100.0 | 115.4 | 114.7 | 112.7 | 109.3 | 104.6 | 98.5 | 91.0 | 82.2 | 72.1 | 60.6 | 47.7 | 33.5 | 17.9 | 1.0 |
| 110.0 | 138.4 | 137.7 | 135.7 | 132.3 | 127.6 | 121.5 | 114.0 | 105.2 | 95.1 | 83.6 | 70.7 | 56.5 | 40.9 | 24.0 |
| 120.0 | 163.5 | 162.8 | 160.8 | 157.4 | 152.7 | 146.6 | 139.1 | 130.3 | 120.2 | 108.7 | 95.8 | 81.6 | 66.0 | 49.1 |
| 130.0 | 190.7 | 190.0 | 188.0 | 184.6 | 179.8 | 173.7 | 166.3 | 157.5 | 147.3 | 135.8 | 123.0 | 108.8 | 93.2 | 76.3 |

This safe distance, referenced dSafetyDistColl, is computed in the following way, depending on the speed vEgo of the follower vehicle, on the specified collision speed vAccidentVelocity and on the predetermined deceleration value aEgoSafetyDist for the follower vehicle while taking into account the delay time of the system:

$$dSafetyDistColl = \max\left(vEgo \cdot tSystemTolerance + 0.5 \cdot \frac{vAccidentVelocity^2 - vEgo^2}{aEgoSafetyDist}, 0\right)$$

The following table provides values of the safe distance based on the predefined collision speed dSafetyDistColl, computed for various combinations of speeds of the follower vehicle and of the target vehicle in km/h, with input parameters of: aEgoSafetyDist=−3.7 m/s², vAccidentVelocity=50 km/h and tSystemTolerance=0.4 s.

TABLE 3 dSafetyDistColl (m)

| vEgo | vTarget | | | | | | | | | | | | | |
|---|---|---|---|---|---|---|---|---|---|---|---|---|---|---|
| | 0.0 | 10.0 | 20.0 | 30.0 | 40.0 | 50.0 | 60.0 | 70.0 | 80.0 | 90.0 | 100.0 | 110.0 | 120.0 | 130.0 |
| 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| 10.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| 20.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| 30.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| 40.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| 50.0 | 5.6 | 5.6 | 5.6 | 5.6 | 5.6 | 5.6 | 5.6 | 5.6 | 5.6 | 5.6 | 5.6 | 5.6 | 5.6 | 5.6 |
| 60.0 | 18.1 | 18.1 | 18.1 | 18.1 | 18.1 | 18.1 | 18.1 | 18.1 | 18.1 | 18.1 | 18.1 | 18.1 | 18.1 | 18.1 |
| 70.0 | 32.8 | 32.8 | 32.8 | 32.8 | 32.8 | 32.8 | 32.8 | 32.8 | 32.8 | 32.8 | 32.8 | 32.8 | 32.8 | 32.8 |
| 80.0 | 49.6 | 49.6 | 49.6 | 49.6 | 49.6 | 49.6 | 49.6 | 49.6 | 49.6 | 49.6 | 49.6 | 49.6 | 49.6 | 49.6 |
| 90.0 | 68.4 | 68.4 | 68.4 | 68.4 | 68.4 | 68.4 | 68.4 | 68.4 | 68.4 | 68.4 | 68.4 | 68.4 | 68.4 | 68.4 |
| 100.0 | 89.3 | 89.3 | 89.3 | 89.3 | 89.3 | 89.3 | 89.3 | 89.3 | 89.3 | 89.3 | 89.3 | 89.3 | 89.3 | 89.3 |
| 110.0 | 112.3 | 112.3 | 112.3 | 112.3 | 112.3 | 112.3 | 112.3 | 112.3 | 112.3 | 112.3 | 112.3 | 112.3 | 112.3 | 112.3 |
| 120.0 | 137.4 | 137.4 | 137.4 | 137.4 | 137.4 | 137.4 | 137.4 | 137.4 | 137.4 | 137.4 | 137.4 | 137.4 | 137.4 | 137.4 |
| 130.0 | 164.6 | 164.6 | 164.6 | 164.6 | 164.6 | 164.6 | 164.6 | 164.6 | 164.6 | 164.6 | 164.6 | 164.6 | 164.6 | 164.6 |

A fourth definition of the safe distance used by the control law cmd of the invention is based on the notion of minimum required stationary distance of the follower vehicle with respect to a target vehicle. This minimum required stationary distance, referenced dTargetDistMin, is more specifically chosen in order to give the driver of the vehicle a feeling of safety and to ensure he has sufficient space to circumvent stationary objects in front of the vehicle, as it approaches them, in particular in situations in which the autonomous drive mode of the vehicle is no longer available.

From the point of view of safety, the minimum stationary distance of the follower vehicle must be chosen greater than zero. By way of example, dTargetDistMin will be set equal to 3 m in the event of a vehicle in front of the follower vehicle, and dTargetDistMin will be set equal to 5 m in the event that the follower vehicle is preceded by an unidentified object or in the event that the follower vehicle arrives at the scene of an accident.

From the point of view of safety, these values are sufficient. Moreover, human behavior in a traffic jam situation is generally completely different. Thus, the stopping distance of the vehicle with respect to the preceding vehicle in a traffic jam is much smaller than the values set above.

The setpoint distance required of the regulating system by the control law results, then, from a choice made between all these various definitions of safe distances as summarized above, this choice being made depending on the speed of the follower vehicle and on the speed of the target vehicle.

More specifically, for each possible combination of speeds of the follower vehicle and of the target vehicle, the control law is designed to determine a setpoint distance, referenced d_cons, S120 corresponding to the maximum of the safe distances required according to the first, second, third and fourth definitions as summarized above.

Thus, this setpoint distance d_cons required of the regulating system of the follower vehicle is computed in the following way, for each combination of speeds of the follower vehicle and of the target vehicle:

$$d\_cons = \max(dTimegap, dSafetyDistStop, dSafetyDistColl, dTargetDistMin)$$

The following table provides the values of this setpoint distance thus computed for the various combinations of speeds of the follower vehicle and of the target vehicle in km/h, on the basis of the examples previously provided for each of the various employed definitions of the safe distance. This table therefore contains the setpoint distances with which the follower vehicle must comply with respect to the target vehicle.

TABLE 4 d_cons = max(dTimegap, dSafetyDistStop, dSafetyDistColl, dTargetDistMin)

| vEgo | vTarget | | | | | | | | | | | | | |
|---|---|---|---|---|---|---|---|---|---|---|---|---|---|---|
| | 0.0 | 10.0 | 20.0 | 30.0 | 40.0 | 50.0 | 60.0 | 70.0 | 80.0 | 90.0 | 100.0 | 110.0 | 120.0 | 130.0 |
| 0.0 | 3 | 3 | 3 | 3 | 3 | 3 | 3 | 3 | 3 | 3 | 3 | 3 | 3 | 3 |
| 10.0 | 5.6 | 5.6 | 5.6 | 5.6 | 5.6 | 5.6 | 5.6 | 5.6 | 5.6 | 5.6 | 5.6 | 5.6 | 5.6 | 5.6 |
| 20.0 | 11.1 | 11.1 | 11.1 | 11.1 | 11.1 | 11.1 | 11.1 | 11.1 | 11.1 | 11.1 | 11.1 | 11.1 | 11.1 | 11.1 |

TABLE 4-continued d_cons = max(dTimegap, dSafetyDistStop, dSafetyDistColl, dTargetDistMin)

| vEgo | vTarget | | | | | | | | | | | | | |
|---|---|---|---|---|---|---|---|---|---|---|---|---|---|---|
| | 0.0 | 10.0 | 20.0 | 30.0 | 40.0 | 50.0 | 60.0 | 70.0 | 80.0 | 90.0 | 100.0 | 110.0 | 120.0 | 130.0 |
| 30.0 | 16.7 | 16.7 | 16.7 | 16.7 | 16.7 | 16.7 | 16.7 | 16.7 | 16.7 | 16.7 | 16.7 | 16.7 | 16.7 | 16.7 |
| 40.0 | 22.2 | 22.2 | 22.2 | 22.2 | 22.2 | 22.2 | 22.2 | 22.2 | 22.2 | 22.2 | 22.2 | 22.2 | 22.2 | 22.2 |
| 50.0 | 31.6 | 30.9 | 28.9 | 27.8 | 27.8 | 27.8 | 27.8 | 27.8 | 27.8 | 27.8 | 27.8 | 27.8 | 27.8 | 27.8 |
| 60.0 | 44.2 | 43.5 | 41.5 | 38.1 | 33.4 | 33.3 | 33.3 | 33.3 | 33.3 | 33.3 | 33.3 | 33.3 | 33.3 | 33.3 |
| 70.0 | 58.9 | 58.2 | 56.2 | 52.8 | 48 | 41.9 | 38.9 | 38.9 | 38.9 | 38.9 | 38.9 | 38.9 | 38.9 | 38.9 |
| 80.0 | 75.6 | 74.9 | 72.9 | 69.5 | 64.8 | 58.7 | 51.3 | 49.6 | 49.6 | 49.6 | 49.6 | 49.6 | 49.6 | 49.6 |
| 90.0 | 94.5 | 93.8 | 91.8 | 88.4 | 83.6 | 77.5 | 70.1 | 68.4 | 68.4 | 68.4 | 68.4 | 68.4 | 68.4 | 68.4 |
| 100.0 | 115.4 | 114.7 | 112.7 | 109.3 | 104.6 | 98.5 | 91 | 89.3 | 89.3 | 89.3 | 89.3 | 89.3 | 89.3 | 89.3 |
| 110.0 | 138.4 | 137.7 | 135.7 | 132.3 | 127.6 | 121.5 | 114 | 112.3 | 112.3 | 112.3 | 112.3 | 112.3 | 112.3 | 112.3 |
| 120.0 | 163.5 | 162.8 | 160.8 | 157.4 | 152.7 | 146.6 | 139.1 | 137.4 | 137.4 | 137.4 | 137.4 | 137.4 | 137.4 | 137.4 |
| 130.0 | 190.7 | 190 | 188 | 184.6 | 179.8 | 173.7 | 166.3 | 164.6 | 164.6 | 164.6 | 164.6 | 164.6 | 164.6 | 164.6 |

Assuming a precise detection of the distance from the preceding, target object or vehicle is implemented by the measuring means on board the follower vehicle, it may be established that, if the regulated distance is greater than the defined setpoint distance, there is no risk of collision.

It may be seen that the greatest required setpoint distances are linked to the follower vehicle approaching a stationary target object. This situation is reflected in the first column of the above table, which defines the setpoint distance for a zero speed of the target. In this first column, the safe distance based on the stopping distance is computed for a presumed braking capacity aEgoSafetyDist of the follower vehicle=−3.7 m/s$^2$, which is relatively low, so as to avoid a safety risk with regard to the traffic behind the follower vehicle. The required setpoint distance based on computing the stopping distance decreases as the braking capacity of the follower vehicle increases.

The invention claimed is:

1. A method for controlling a regulating system for regulating a distance between a target vehicle and a follower vehicle, the regulating system being on board the follower vehicle, the method comprising:
    implementing a control law for regulating the distance which computes, for a plurality of possible combinations of travel speeds of the follower vehicle and of the target vehicle, at least potential setpoint distances, including:
        a first distance computed on a basis of a predetermined time interval, corresponding to a distance covered by said follower vehicle in said time interval depending on a travel speed of the follower vehicle,
        a second distance computed depending on respective travel speeds of the follower and target vehicles and on predetermined deceleration values for said vehicles, said predetermined deceleration values corresponding to the deceleration which said vehicles undergo during emergency braking,
        a third distance established on a basis of a predefined speed of collision with a preceding stationary vehicle, defined with respect to a specified maximum speed for such a collision, said third distance being computed depending on the travel speed of the follower vehicle, on the specified maximum speed and on the predetermined deceleration value for the follower vehicle, and
        a fourth distance corresponding to a minimum stationary distance of the follower vehicle with respect to the target vehicle, said minimum stationary distance corresponding to a distance in which the follower vehicle is stoppable when an autonomous drive mode of the follower vehicle is unavailable;
    determining, for a given combination of travel speeds of the follower and target vehicles from among the plurality of possible combinations, a final setpoint distance from among setpoint distances previously computed by said control law; and
    controlling the regulating system that is on board the follower vehicle based on the determined final setpoint distance.

2. The method as claimed in claim 1, wherein the determining the final setpoint distance comprises evaluating the distance corresponding to a maximum of the first, second, third and fourth potential distances for the given combination of travel speeds of the follower and target vehicles.

3. The method as claimed in claim 1, wherein said second distance (dSafetyDistStop) is computed using the respective travel speed values (vEgo) and (vTarget) for the follower and target vehicles and the predetermined deceleration values (aEgoSafetyDist) and (aTargetSafetyDist) for said vehicles, using expression:

$$dSafetyDistStop = \max\left(vEgo \cdot tSystemTolerance - \frac{0.5 \cdot vEgo^2}{aEgoSafetyDist} + \frac{0.5 \cdot vTarget^2}{aTargetSafetyDist}, 0\right)$$

parameter (tSystemTolerance) corresponding to a delay time of the system.

4. The method as claimed in claim 3, wherein the delay time of the system is defined by a time needed to reach a required braking force and/or by a perception-reaction time of the system.

5. The method as claimed in claim 1, wherein the controlling of the regulating system includes controlling an engine torque or brakes of the follower vehicle.

6. The method as claimed in claim 1, wherein the predetermined deceleration value of the follower vehicle is closer to 0 m/s$^2$ than the predetermined deceleration value of the target vehicle.

7. A method for controlling a regulating system for regulating a distance between a target vehicle and a follower vehicle, the regulating system being on board the follower vehicle, the method comprising:
    implementing a control law for regulating the distance which computes, for a plurality of possible combinations of travel speeds of the follower vehicle and of the target vehicle, at least potential setpoint distances, including:

- a first distance computed on a basis of a predetermined time interval, corresponding to a distance covered by said follower vehicle in said time interval depending on a travel speed of the follower vehicle,
- a second distance computed depending on respective travel speeds of the follower and target vehicles and on predetermined deceleration values for said vehicles, said predetermined deceleration values corresponding to the deceleration which said vehicles undergo during emergency braking,
- a third distance established on a basis of a predefined speed of collision with a preceding stationary vehicle, defined with respect to a specified maximum speed for such a collision, said third distance being computed depending on the travel speed of the follower vehicle, on the specified maximum speed and on the predetermined deceleration value for the follower vehicle, and
- a fourth distance corresponding to a minimum stationary distance of the follower vehicle with respect to the target vehicle, wherein said third distance (dSafetyDistColl) is computed using the travel speed value (vEgo) for the follower vehicle, the specified maximum speed value (vAccidentVelocity) for a collision and the predetermined deceleration value (aEgoSafetyDist) for the follower vehicle, using expression:

$$dSafetyDistColl = \max\left(vEgo \cdot tSystemTolerance + 0.5 \cdot \frac{vAccidentVelocity^2 - vEgo^2}{aEgoSafetyDist}, 0\right)$$

parameter (tSystemTolerance) corresponding to a delay time of the system;

determining, for a given combination of travel speeds of the follower and target vehicles from among the plurality of possible combinations, a final setpoint distance from among setpoint distances previously computed by said control law; and controlling the regulating system that is on board the follower vehicle based on the determined final setpoint distance.

8. The method as claimed in claim 7, wherein the delay time of the system is defined by a time needed to reach a required braking force and/or by a perception-reaction time of the system.

9. The method as claimed in claim 7, wherein the predetermined deceleration value of the follower vehicle is closer to 0 m/s$^2$ than the predetermined deceleration value of the target vehicle.

* * * * *